United States Patent [19]

Nagamatsu et al.

[11] Patent Number: 5,598,361

[45] Date of Patent: Jan. 28, 1997

[54] DISCRETE COSINE TRANSFORM PROCESSOR

[75] Inventors: Tetsu Nagamatsu, Kawasaki, Japan; Lee-Sup Kim, Dongdaemoon-Ku, Rep. of Korea

[73] Assignee: Kabushiki Kaisha Toshiba, Tokyo, Japan

[21] Appl. No.: 329,382

[22] Filed: Oct. 26, 1994

[30] Foreign Application Priority Data

Oct. 26, 1993 [JP] Japan .................................. 5-267376

[51] Int. Cl.$^6$ .................................................. G06F 17/14
[52] U.S. Cl. .................................................. 364/725
[58] Field of Search .................................. 364/725, 726

[56] References Cited

U.S. PATENT DOCUMENTS

| | | | |
|---|---|---|---|
| 4,829,465 | 5/1989 | Knauer et al. | 364/725 |
| 4,831,574 | 5/1989 | Duhamel | 364/725 |
| 5,249,146 | 9/1993 | Uramoto et al. | 364/725 |
| 5,268,853 | 12/1993 | Tanaka et al. | 364/725 |
| 5,357,453 | 10/1994 | Kim et al. | 364/725 |
| 5,361,220 | 11/1994 | Asano | 364/725 |

FOREIGN PATENT DOCUMENTS

| | | |
|---|---|---|
| 417464 | 1/1992 | Japan . |
| 5153402 | 6/1993 | Japan . |

OTHER PUBLICATIONS

Shin–ichi Uramoto, et al., "A 100–MHz 2–D Discrete Cosine Transform Core Processor", IEEE Journal of Solid- -State Circuits, vol. 27, No. 4, Apr. 1992, pp. 390–396.

Kunitoshi Aono, et al., "A Video Digital Signal Processor with a Vector–Pipeline Architecture", IEEE Journal of Solid–State Circuits, vol. 27, No. 12, Dec. 1992, pp. 1886–1894.

Haralambos C. Karathanasis, "On Computing the 2–D Cosine Transform Using Rotations", Microprocessing and Microprogramming, vol. 38, Sep. 1993, pp. 359–365.

Weiping Li, "A New Algorithm to Compute the DCT and its Inverse", IEEE Transactions on Acoustics, Speech and Signal Processing, vol. 39, No. 6, Jun. 1991, pp. 1305–1313.

*Primary Examiner*—Chuong D. Ngo
*Attorney, Agent, or Firm*—Loeb & Loeb LLP

[57] ABSTRACT

A discrete cosine transform processor for executing discrete cosine transform calculations in both forward and inverse directions on the basis of previously stored product addition data has a memory having a first memory section for storing product addition calculation data for the forward direction transformation and a second memory section for storing product addition calculation data for the inverse direction transformation other than data in common to those stored in the first memory section; and sign inverter for inverting signs of the data used in common for the inverse direction transformation, among the data stored in the first memory section. The memory preferably includes first memory for storing product addition data corresponding to even-order coefficients and second memory for storing product addition data corresponding to odd-order coefficients; and only the second memory stores data used in common for both the forward and inverse direction transformations in the first memory thereof.

13 Claims, 6 Drawing Sheets

2 BANK ROM

FIG. I  PRIOR ART

DISCRETE COSINE TRANSFORM PROCESSOR

BACKGROUND OF THE INVENTION

The present invention relates to a discrete cosine transform processor suitable for use to compress and expand image data, in particular.

Recently, since semiconductor technology has advanced markedly and in addition International Standards (e.g., CCITT H261, ISO, MPEG, etc.) with respect to image data coding have been established, LSIs for compressing and expanding image data are now being developed. The basis of the standards of the image data compression and expansion technique resides in two-dimensional discrete cosine transformation. Here, the two-dimensional discrete cosine transformation at N×N points in the forward direction can be expressed by the following formula:

$$X(u,v) = \frac{2}{N} C(u)C(v) \sum_{i=0}^{N-1} \sum_{j=0}^{N-1} x(i,j) \cos \frac{(2i+1)u\pi}{2N} \cos \frac{(2j+1)v\pi}{2N} \quad (1)$$

where $x(i, j)$ ($i, j=0, 1, \ldots, N-1$) denote the original signals (image data) and $X(u, v)$ ($u, v=0, 1, \ldots, N-1$) denote the transformed coefficients. Further, when $u=v=0$, $C(0)=C(0)=2^{-1/2}$ and when u and $V \neq 0$, $C(u)=C(v)=1$.

Further, the discrete cosine transformation in the inverse direction can be expressed by the following formula:

$$X(i,j) = \frac{2}{N} \sum_{u=0}^{N-1} \sum_{v=0}^{N-1} C(u)C(v)X(u,v) \cos \frac{(2i+1)u\pi}{2N} \cos \frac{(2j+1)v\pi}{2N} \quad (2)$$

Now, assuming that X denotes a matrix of N×N having components of X(u, v) (where u denotes the u-th row and v denotes the v-th column); x denotes a matrix of N×N having components of x(i, j) (where i denotes the i-th row and j denotes the j-th column); and further $$C_{u,i} = (2/N)^{1/2} C(u) \cos((2i+1)u\pi/N)$$

denotes a transform matrix C of N×N having components of the u-th row and the i-th column), the above-mentioned formulae (1) and (2) can be expressed as follows:

$$X = C \cdot x \cdot C^t \quad (3)$$

$$x = C^t \cdot X \cdot C \quad (4)$$

where $C^t$ denotes the transposed matrix of the matrix C. The above formulae (3) and (4) indicate that the two-dimensional discrete cosine transformation can be obtained by twice achieving the one-dimensional discrete cosine transformation.

In the case of the general two-dimensional discrete cosine transformation used for image data compression and expansion, the transformation is usually executed in unit of block of 8 (vertical pixels)×8 (horizontal pixels). Therefore, the case of N=8 will be explained hereinbelow by way of example. In this case, since the transform matrix is a (8×8) matrix, it has been so far necessary to simply execute multiplication and accumulation calculations 4096 times. Therefore, in order to realize a discrete cosine transform LSI, the important problem is to execute a great amount of multiplication and accumulation calculations at high speed by use of a small-scaled circuit.

Now, a technique to execute a great amount of multiplication and accumulation calculations effectively is so far known. In this technique, the two-dimensional discrete cosine transformation is executed by separating it into two one-dimensional discrete cosine transformation calculations in the row and column directions. In more detail, in this technique, the one-dimensional discrete cosine transformation is executed for the input data in the row direction, and the calculated results are inverted by and then stored in an inversion RAM. Further, these inverted data are further transformed on the basis of one-dimensional discrete cosine transformation in the column direction to obtain the two-dimensional discrete cosine transform coefficients. Further, in the above-mentioned technique, a high speed algorithm for one-dimensional discrete cosine transformation has been used. The discrete cosine transformation in the forward direction executed in accordance with this high speed algorithm can be expressed as follows:

$$\begin{bmatrix} X_0 \\ X_2 \\ X_4 \\ X_6 \end{bmatrix} = \frac{1}{2} \begin{bmatrix} A & A & A & A \\ B & C & -C & -B \\ A & -A & -A & A \\ C & -B & B & -C \end{bmatrix} \begin{bmatrix} x_0 + x_7 \\ x_1 + x_6 \\ x_2 + x_5 \\ x_3 + x_4 \end{bmatrix} \quad (5)$$

$$\begin{bmatrix} X_1 \\ X_3 \\ X_5 \\ X_7 \end{bmatrix} = \frac{1}{2} \begin{bmatrix} D & E & F & G \\ E & -G & -D & -F \\ F & -D & G & E \\ G & -F & E & -D \end{bmatrix} \begin{bmatrix} x_0 - x_7 \\ x_1 - x_6 \\ x_2 - x_5 \\ x_3 - x_4 \end{bmatrix} \quad (6)$$

where $A=\cos(\pi/4)$, $B=\cos(\pi/8)$, $C=\sin(\pi/8)$, $D=\cos(\pi/16)$, $E=\cos(3\pi/16)$, $F=\sin(3\pi/16)$, $F=\sin(3\pi/16)$, and $G=\sin(\pi/16)$, which are all transform matrix components; $xi$ ($i=0, 1, \ldots, 7$) denote the original signals and $Xj$ ($j=0, 1, \ldots, 7$) denote the transform coefficients.

Further, the discrete cosine transformation in the inverse direction executed in accordance with this high speed algorithm can be expressed as follows:

$$\begin{bmatrix} x_0 \\ x_2 \\ x_4 \\ x_6 \end{bmatrix} = \frac{1}{2} \begin{bmatrix} A & B & A & C \\ A & -C & -A & B \\ A & -B & A & -C \\ A & C & -A & -B \end{bmatrix} \begin{bmatrix} X_0 \\ X_2 \\ X_4 \\ X_6 \end{bmatrix} + \quad (7)$$

$$\frac{1}{2} \begin{bmatrix} D & E & F & G \\ F & -D & G & E \\ -G & F & -E & D \\ -E & G & D & F \end{bmatrix} \begin{bmatrix} X_1 \\ X_3 \\ X_5 \\ X_7 \end{bmatrix}$$

$$\begin{bmatrix} x_1 \\ x_3 \\ x_5 \\ x_7 \end{bmatrix} = \frac{1}{2} \begin{bmatrix} A & C & -A & -B \\ A & -B & A & -C \\ A & -C & -A & B \\ A & B & A & C \end{bmatrix} \begin{bmatrix} X_0 \\ X_2 \\ X_4 \\ X_6 \end{bmatrix} - \quad (8)$$

$$\frac{1}{2} \begin{bmatrix} -E & G & D & F \\ -G & F & -E & D \\ F & -D & G & E \\ D & E & F & G \end{bmatrix} \begin{bmatrix} X_1 \\ X_3 \\ X_5 \\ X_7 \end{bmatrix}$$

In the prior art discrete cosine transform processor for executing the discrete calculations in both the forward and inverse directions in accordance with the above-mentioned formulae (5), (6), (7) and (8), the discrete calculation results have been so far obtained as follows: external data are inputted through a data input device; the calculations are executed through adders, subtracters, registers, etc. in combination; and the discrete calculation results are obtained on the basis of multiplication and accumulation calculation results stored in a read only memory.

The data input device to which external data are input holds image data $x_0, \ldots, x_7$ in the case of the forward direction transformation and transform coefficients $X_0, \ldots, X_7$ in the case of the inverse direction transformation. The data input device is constructed by two banks of orthogonal memory (corner turn memory) (two bank ROM) for executing parallel-serial transformation, as shown in FIG. 1. In more detail, as shown in FIG. 2, the orthogonal memory includes 8 word WORD0, . . . , WORD7, and the WORDi (i=0, . . . , 7) holds the input data $x_i$ or $X_i$. Therefore, each word has a number of bits the same as that of the input data. For instance, if the input data $x_i$ or $X_i$ is 16-bit data, the number of bits of each word of the orthogonal memory is 16. In the case of the orthogonal memory, data are generally written in the word direction and read in one bit column direction, so that it is possible to execute parallel-serial transformation. In the data input device as shown in FIG. 2, 8 input data $x_0, \ldots, x_7$ or $X_0, \ldots, X_7$ are written in the A-bank of the orthogonal memory. Further, when these written data are being read, the succeeding 8 input data are written in the B-bank of the orthogonal memory, so that the data can be inputted continuously. Further, in this data read, the input data are read 2 bits by 2 bits in one cycle beginning from the less significant bit. Now, if the input data are of 16 bits, 8 cycles are required to read the input data completely. Further, the data input device has 8 output terminals $2_1$ to $2_8$, and 2-digit 2-bit input data of $x_i$ or $X_i$ are outputted in each cycle from the output terminal $2_i$ (i=1, . . . , 8). For instance, if the input data ($x_i$ or $X_i$) are $d_{15}, d_{14}, \ldots, d_1, d_0$, 2-digit 2-bit data $d_{2j-1}$ and $d_{2j-2}$ are outputted from the output terminal $2_i$ in j (j=1, . . . , 8) cycle.

Further, two read only memories (ROMs) are used for discrete calculations to store the multiplication and accumulation calculation results. The multiplication and accumulation data of the even-order coefficients are stored in one of the ROMs and those of odd-order coefficients are stored in the other thereof. Further, each ROM includes 4 (first to fourth) memory sections.

The data stored in the first to fourth memory sections are different from each other between the forward direction transformation and the inverse direction transformation, so that the ROM is composed of two banks as shown in FIG. 1. The ROM shown in FIG. 1 is of contact program ROM type, in which NMOS transistors whose gates are connected to word lines 42, respectively are used as memory cells, and the ROM can be programmed depending upon whether the drains (on the side opposite to the bit line 43) of these transistors are connected to any of the 4 program lines 46, 47, 48 and 49 or not.

In the prior art discrete cosine transform processor based upon the above-mentioned discrete calculation system, in order to use the read only memory in common for both the forward and inverse directions, since the contact program system of two-bank construction is adopted, the data stored therein can be replaced between the forward and inverse direction transformations. However, in the prior art two-bank construction, since 4 control lines are necessary, there exists a problem in that a large area is required, so that the chip size of the discrete cosine transform processor increases inevitably.

On the other hand, another prior art discrete cosine transform processor is disclosed in Japanese Laid-open Patent Application 5-153402 (1993) such that the discrete cosine transform (DCT) calculations are executed by sampling the input data of a plurality of dimensions 2 bits by 2 bits for each dimension and by using look-up tables prepared for each of the two bits and for each of the forward and inverse DCT matrices. In this prior art DCT processor, however, since two ROMs for storing the same data are required for both the forward and inverse transformation directions in order to execute 2-digit processing in one cycle, 4 ROM tables are necessary for each coefficient, so that the ROM tables as large as 64 are required in the case of 2 dimensions of 8 coefficients. In other words, in this prior art processor, there exists another problem in that the number of necessary ROM tables is large.

SUMMARY OF THE INVENTION

With these problems in mind, therefore, the object of the present invention is to provide a discrete cosine transform processor which can use a memory of as small a size as possible as a whole.

According to the present invention, there is provided a discrete cosine transform processor for executing discrete cosine transform calculations in both forward and inverse directions on the basis of previously stored product addition data, having:

memory means having a first memory section for storing multiplication and accumulation calculation data for the forward direction transformation and a second memory section for storing multiplication and accumulation calculation data for the inverse direction transformation other than data in common to those stored in the first memory section; and sign inverting means for inverting signs of the data used in common for the inverse direction transformation, among the data stored in the first memory section.

In the discrete cosine transform processor according to the present invention, memory means for storing multiplication and accumulation data can be used in common for both the forward and inverse direction transformations by providing inverting means for inverting a part of data and by making the best use of the fact that many transform coefficients can be used in common for both the forward and inverse direction discrete cosine transformations. As a result, it is possible to reduce the effective area occupied by the memory means and thereby to reduce the size of the transform processor.

DETAILED DESCRIPTION OF THE PREFERRED EMBODIMENTS

Figure 1:
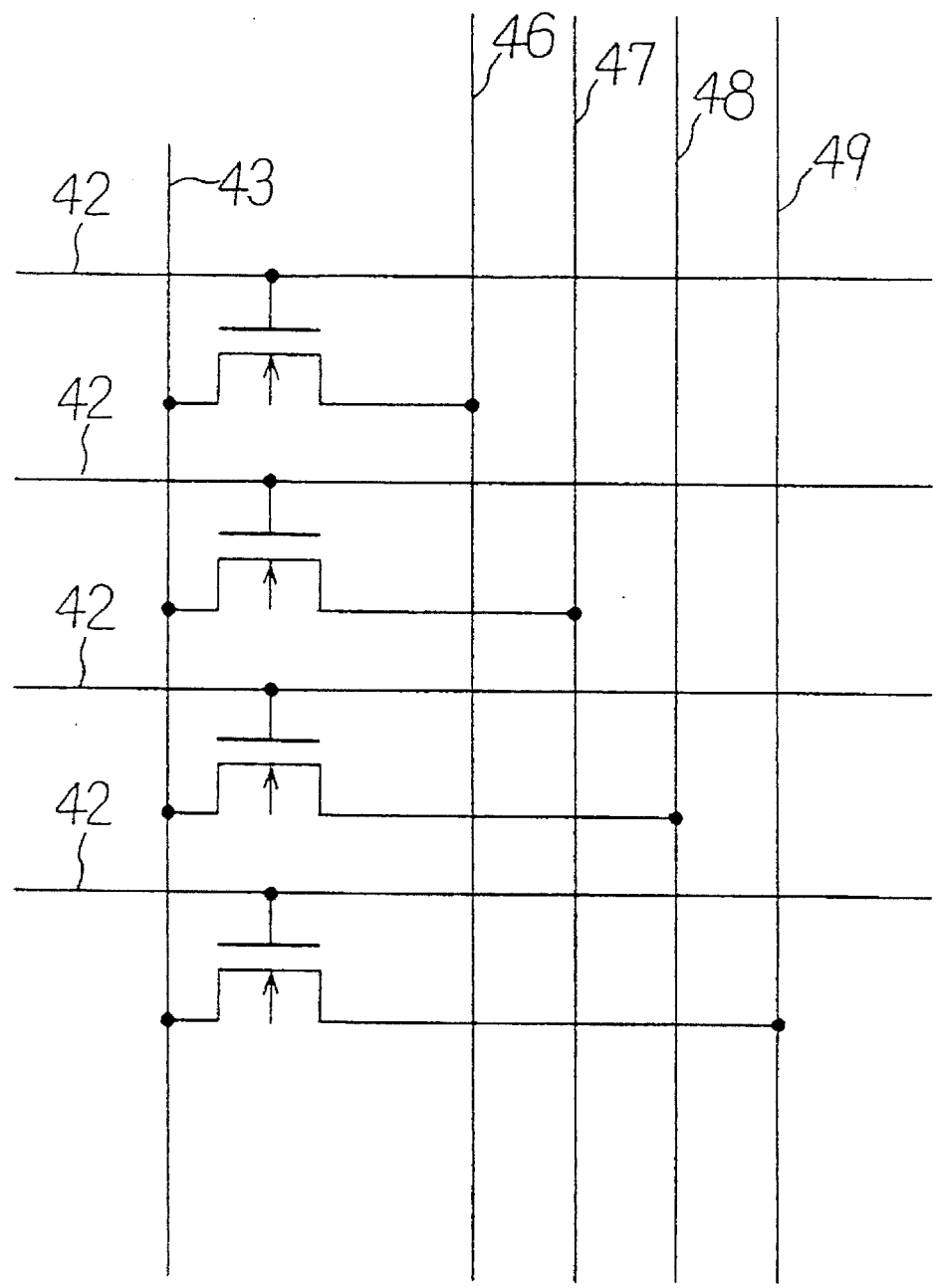
FIG. 1 is a circuit diagram showing a prior art ROM of two-bank structure.
Figure 2:
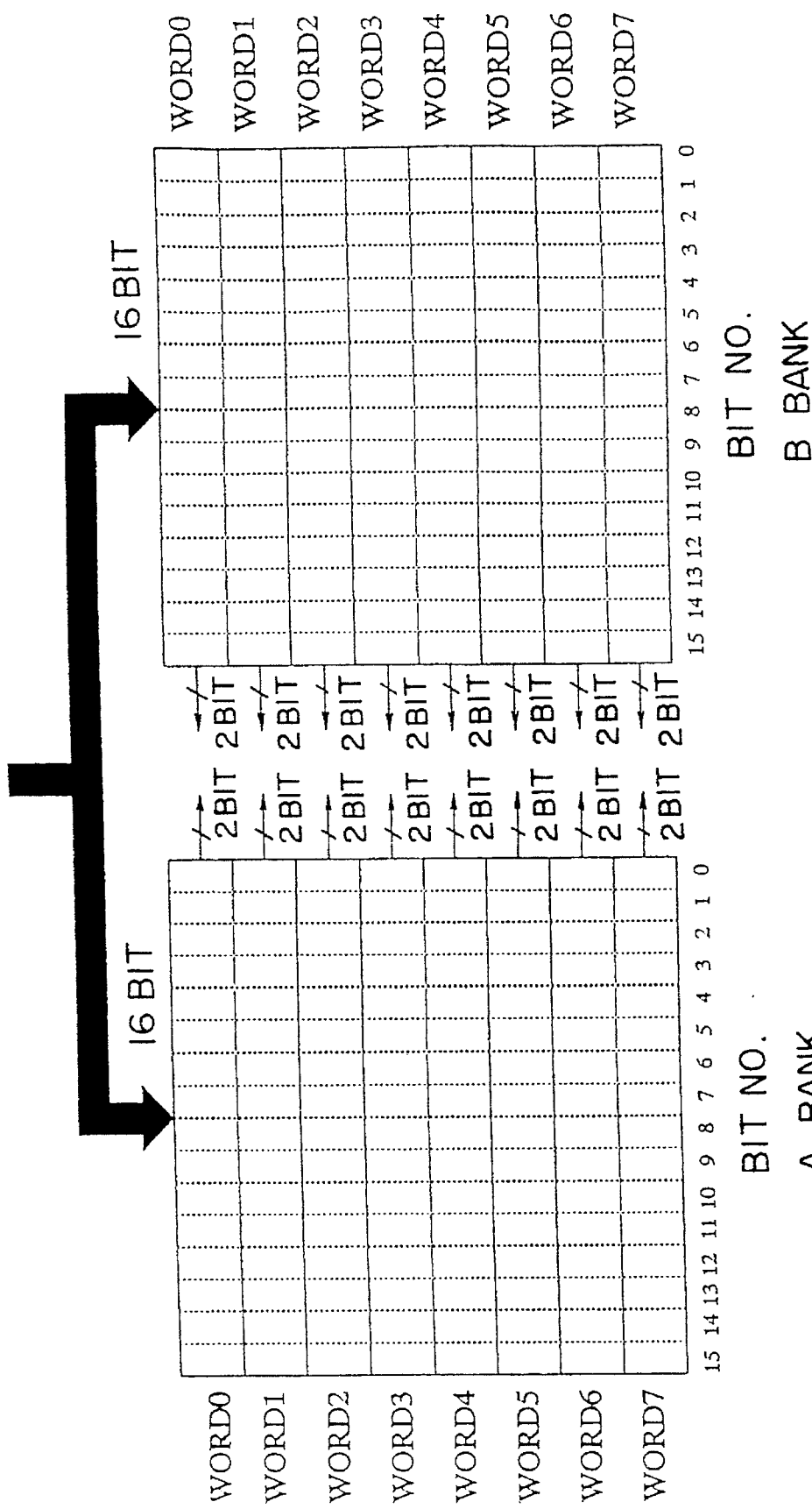
FIG. 2 is a pattern view showing a prior art practical data input device.
Figure 3:
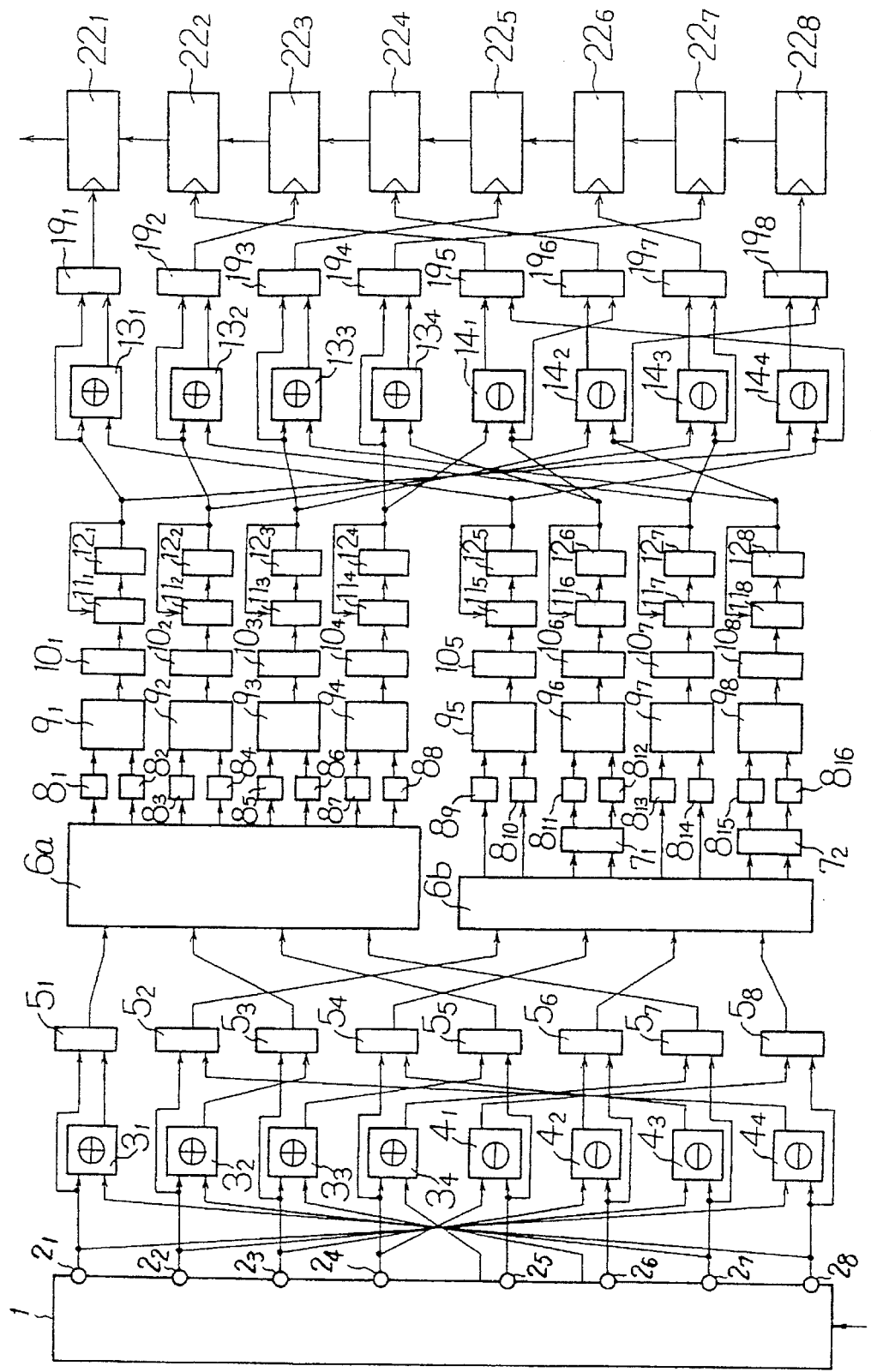
FIG. 3 is a block diagram showing a first embodiment of the discrete cosine transform processor according to the present invention.

FIG. 3 shows a first embodiment of the discrete cosine transform processor according to the present invention. This discrete cosine transform processor comprises a data input device 1, adders $3_1, \ldots, 3_4$, subtracters $4_1, \ldots, 4_4$, select switches $5_1, \ldots, 5_4$, read only memories 6a and 6b, complement generators $7_1$ and $7_2$, pipe-line registers $8_1, \ldots$ . . , $8_{16}$, adders $9_1, \ldots, 9_8$, pipe-line registers $10_1, \ldots, 10_8$, adders $11_1, \ldots, 11_8$, registers $12_1, \ldots, 12_8$, adders $13_1, \ldots, 13_4$, subtracters $14_1$ and $14_4$, select switches $19_1$ and $19_8$, and output registers $22_1, \ldots, 22_8$.

As already described, the data input device 1 holds the data inputted from the outside, that is, image data $x_0, \ldots x_7$ in the case of the forward direction transformation and transform coefficients $X_0, \ldots X_7$ in the case of the inverse direction transformation, for instance.

As shown in FIG. 3, the data input device 1 has 8 output terminals $2_1, \ldots, 2_8$, and 2-digit 2-bit input data $x_i$ or $X_i$ are outputted from the output terminal $2_i$ (i=1, . . . , 8) for each cycle. For instance, if the input data ($x_i$ or $X_i$) are $d_{15}$, $d_{14}$, . . . , $d_1$, $d_0$, 2-digit 2-bit data $d_{2j-1}$ and $d_{2j-2}$ are outputted from the output terminal $2_i$ in j (j =1, . . . , 8) cycle.

The output ($x_0$ or $X_0$) of the output terminal $2_1$ are transmitted to the adder $3_1$, the subtracter $4_4$, and the select switch $5_1$, and the output ($x_1$ or $X_1$) of the output terminal $2_2$ are transmitted to the adder $3_2$, the subtracter $4_3$, and the select switch $5_2$. The output ($x_2$ or $X_2$) of the output terminal $2_3$ are transmitted to the adder $3_3$, the subtracter $4_2$, and the select switch $5_3$, and the output ($x_3$ or $X_3$) of the output terminal $2_4$ are transmitted to the adder $3_4$, the subtracter $4_1$, and the select switch $5_4$. Further, the output ($x_4$ or $X_4$) of the output terminal $2_5$ are transmitted to the adder $3_4$, the subtracter $4_1$, and the select switch $5_5$, and the output ($x_5$ or $X_5$) of the output terminal $2_6$ are transmitted to the adder $3_5$, the subtracter $4_2$, and the select switch $5_6$. The output ($x_6$ or $X_6$) of the output terminal $2_7$ are transmitted to the adder $3_2$, the subtracter $4_3$, and the select switch $5_7$, and the output ($x_7$ or $X_7$) of the output terminal $2_8$ are transmitted to the adder $3_1$, the subtracter $4_4$, and the select switch $5_8$.

The adder $3_1$ calculates the addition ($x_0+x_7$ or $X_0+X_7$) of the outputs of the output terminals $2_1$ and $2_8$, and transmits the calculated result to the select switch $5_1$, and the adder $3_2$ calculates the addition ($x_1+x_6$ or $X_1+X_6$) of the outputs of the output terminals $2_2$ and $2_7$, and transmits the calculated result to the select switch $5_3$. Further, the adder $3_3$ calculates the addition ($x_2+x_5$ or $X_2+X_5$) of the outputs of the output terminals $2_3$ and $2_6$, and transmits the calculated result to the select switch $5_5$, and the adder $3_4$ calculates the addition ($x_3+x_4$ or $X_3+X_4$) of the outputs of the output terminals $2_4$ and $2_5$, and transmits the calculated result to the select switch $5_7$. On the other hand, the subtracter $4_1$ calculates the subtraction ($x_0-x_7$ or $X_0-X_7$) between the outputs of the output terminals $2_1$ and $2_8$, and transmits the calculated result to the select switch $5_8$, and the subtracter $4_2$ calculates the subtraction ($x_1-x_6$ or $X_1-X_6$) between the outputs of the output terminals $2_2$ and $2_7$, and transmits the calculated result to the select switch $5_6$. Further, the subtracter $4_3$ calculates the subtraction ($x_2-x_5$ or $X_2-X_5$) between the outputs of the output terminals $2_3$ and $2_6$, and transmits the calculated result to the select switch and the subtracter $4_4$ calculates the subtraction ($x_3-x_4$ or $X_3-X_4$) between the outputs of the output terminals $2_4$ and $2_5$, and transmits the calculated result to the select switch $5_2$.

The select switch $5_1$ selects and outputs the output ($x_0+x_7$) of the adder $3_1$ in the case of the forward direction transformation but the output ($X_0$) of the output terminal $2_1$ in the case of the inverse direction transformation. The select switch 52 selects and outputs the output ($x_0-x_7$) of the subtracter $4_4$ in the case of the forward direction transformation but the output ($X_1$) of the output terminal $2_2$ in the case of the inverse direction transformation. The select switch $5_3$ selects and outputs the output ($x_1+x_6$) of the adder $3_2$ in the case of the forward direction transformation but the output ($X_2$) of the output terminal $2_3$ in the case of the inverse direction transformation. The select switch $5_4$ selects and outputs the output ($x_1-x_6$) of the subtracter $4_3$ in the case of the forward direction transformation but the output ($X_3$) of the output terminal $2_4$ in the case of the inverse direction transformation. Further, the select switch $5_5$ selects and outputs the output ($x_2+x_5$) of the adder $3_3$ in the case of the forward direction transformation but the output ($X_4$) of the output terminal $2_5$ in the case of the inverse direction transformation. The select switch $5_6$ selects and outputs the output ($x_2-x_5$) of the subtracter $4_2$ in the case of the forward direction transformation but the output ($X_5$) of the output terminal $2_6$ in the case of the inverse direction transformation. The select switch $5_7$ selects and outputs the output ($x_3+x_4$) of the adder $3_4$ in the case of the forward direction transformation but the output ($X_6$) of the output terminal $2_7$ in the case of the inverse direction transformation. The select switch $5_8$ selects and outputs the output ($x_3-x_4$) of the subtracter $4_1$ in the case of the forward direction transformation but the output ($X_7$) of the output terminal $2_8$ in the case of the inverse direction transformation.

The outputs of the select switches $5_1$, $5_3$, $5_5$ and $5_7$ are given to the ROM $6a$, and the outputs of the select switches $5_2$, $5_4$, $5_6$ and $5_8$ are given to the ROM $6b$, respectively.

The ROMs $6a$ and $6b$ are read only memories used for discrete calculations, that is, for storing the multiplication and accumulation calculation results. Further, the ROM $6a$ stores the multiplication and accumulations data of even-degree coefficients and the ROM $6b$ stores the multiplication and accumulations data of odd-degree coefficients. Further, the ROMs $6a$ and $6b$ include first to fourth memory sections, respectively.

Here, in the two continuous 2-digit 2-bit data outputted by the select switch $5_i$ (i=1, . . . , 8), the less significant bit data thereof are denoted by $Y_{ai-1}$ and the more significant bit data thereof are denoted by $Y_{bi-1}$. Then, the respective first to fourth memory sections of the ROM $6a$ output two multiplication and accumulation data stored in the memory cells at the respective addresses determined by the less significant 4 bit data $y_{a0}$, $y_{a2}$, $y_{a4}$, $y_{a6}$ and the more significant 4 bit data $y_{b0}$, $y_{b2}$, $y_{b4}$, $y_{b6}$, respectively on the basis of the outputs $y_{a0}$, $y_{b0}$, $y_{a2}$, $y_{b2}$, $y_{a4}$, $y_{b4}$, $y_{a6}$, and $y_{b6}$ of the select switches $5_1$, $5_3$, $5_5$ and $5_7$.

For instance, in the case of the forward direction transformation, data corresponding to the multiplication and accumulation of the first row on the right side in formula (5) expressed as follows are stored in the memory cells at the addresses $y_0$, $y_2$, $y_4$, $y_6$ of the first memory section of the ROM $6a$:

$$(Ay_0+Ay_2+Ay_4+Ay_6)/2$$

On the other hand, in the case of the inverse direction transformation, data corresponding to the multiplication and accumulation of the first term and the first row on the right side in formula (7) expressed as follows are stored in the memory cells at the addresses $y_0$, $y_2$, $y_4$, $y_6$ of the first memory section of the ROM $6a$:

$$(Ay_0+By_2+Ay_4+Cy_6)/2$$

Here, the multiplication and accumulation data corresponding to the less and more significant bits are read by and held in the pipe-line registers $8_1$ and $8_2$, respectively.

Further, in the case of the forward direction transformation, data corresponding to the multiplication and accumulation of the second row on the right side in formula (5)

expressed as follows are stored in the memory cells at the addresses $y_0$, $y_2$, $y_4$, $y_6$ of the second memory section of the ROM 6a:

$$(By_0+Cy_2-Cy_4-By_6)/2$$

On the other hand, in the case of the inverse direction transformation, data corresponding to the multiplication and accumulation of the first term and the first row on the right side in formula (7) expressed as follows are stored in the memory cells at the addresses $y_0$, $y_2$, $y_4$, $y_6$ of the second memory section of the ROM 6a:

$$(Ay_0-Cy_2-Ay_4+By_6)/2$$

Here, the multiplication and accumulation data corresponding to the less and more significant bits are read by and held in the pipe-line registers $\mathbf{8}_3$ and $\mathbf{8}_4$, respectively.

Further, in the case of the forward direction transformation, data corresponding to the multiplication and accumulation of the third row on the right side in formula (5) expressed as follows are stored in the memory cells at the addresses $y_0$, $y_2$, $y_4$, $y_6$ of the third memory section of the ROM 6a:

$$(Ay_0-Ay_2-Ay_4+Ay_6)/2$$

On the other hand, in the case of the inverse direction transformation, data corresponding to the multiplication and accumulation of the first term and the third row on the right side in formula (7) expressed as follows are stored in the memory cells at the addresses $y_0$, $y_2$, $y_4$, $y_6$ of the third memory section of the ROM 6a:

$$(Ay_0-By_2+Ay_4-Cy_6)/2$$

Here, the product addition data corresponding to the less and more significant bits are read by and held in the pipe-line registers $\mathbf{8}_5$ and $\mathbf{8}_6$, respectively.

Further, in the case of the forward direction transformation, the multiplication and accumulation data corresponding to the fourth row on the right side of the formula (5) expressed as follows are stored in the memory cells at the address $y_0$, $y_2$, $y_4$, $y_6$ of the fourth memory section of the ROM 6a:

$$(Cy_0-By_2+By_4-Cy_6)/2$$

On the other hand, in the case of the inverse direction transformation, the multiplication and accumulation data corresponding to the first term and the fourth row on the right side of the formula (7) expressed as follows are stored in the memory cells at the address $y_0$, $y_2$, $y_4$, $y_6$ of the fourth memory section of the ROM 6a:

$$(Ay_0+Cy_2-Ay_4-By_6)/2$$

Here, the multiplication and accumulation data corresponding to the less and more significant bits are read by and held in the pipe-line registers $\mathbf{8}_7$ and $\mathbf{8}_8$, respectively.

Figure 6:
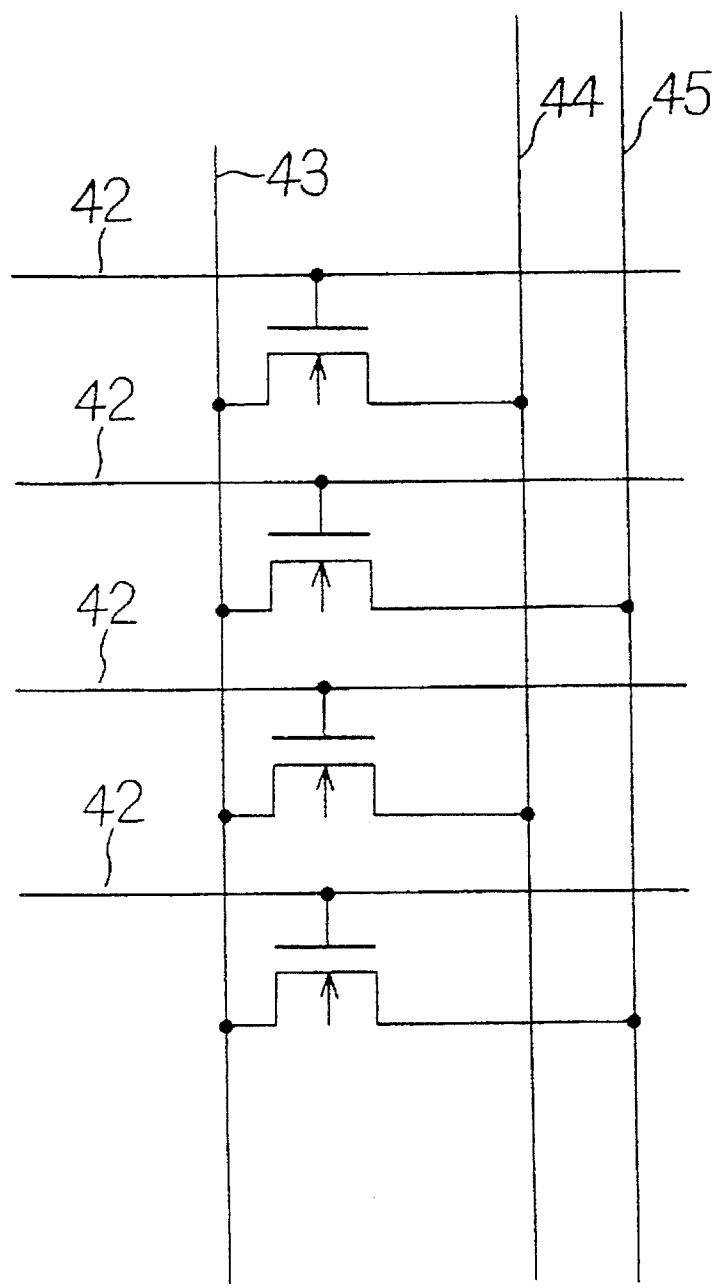
FIG. 6 is a circuit diagram showing a ROM of one-bank structure.

On the other hand, the ROM 6b stores the multiplication and accumulation results of the odd-degree coefficients, and includes first to fourth memory sections in the same way as with the case of the prior art transform processor. However, being different from the prior art ROM, the first to fourth memory sections of the ROM 6b is ROM of one-bank construction which can be programmed by two program lines 44 and 45 as shown in FIG. 6. Therefore, these two program lines are used in common, irrespective of the forward and inverse direction transformations. Further, the respective first to fourth memory sections of the ROM 6b output two multiplication and accumulation data stored in the memory cells at the respective addresses determined by the less significant 4 bit data $y_{a1}$, $y_{a3}$, $y_{a5}$, $y_{a7}$ and the more significant 4 bit data $y_{b1}$, $y_{b3}$, $y_{b5}$, $y_{b7}$, on the basis of the outputs $y_{a1}$, $y_{b1}$, $y_{a3}$, $y_{b3}$, $y_{a5}$, $y_{b5}$, $y_{a7}$, and $y_{b7}$ of the select switches $\mathbf{5}_2$, $\mathbf{5}_4$, $\mathbf{5}_6$ and $\mathbf{5}_8$. For instance, the multiplication and accumulation data corresponding to the multiplication and accumulation of the first row on the right side in formula (6) expressed as follows are stored in the memory cells at the addresses $y_1$, $y_3$, $y_5$, $y_7$ of the first memory section of the ROM 6b:

$$(Dy_1+Ey_3+Fy_5+Gy_7)/2$$

Here, the multiplication and accumulation data corresponding to the less and more significant bits are read by and held in the pipe-line registers $\mathbf{8}_9$ and $\mathbf{8}_{10}$, respectively.

Further, the multiplication and accumulation data corresponding to the multiplication and accumulation of the second row on the right side in formula (6) expressed as follows are stored in the memory cells at the addresses $y_1$, $y_3$, $y_5$, $y_7$ of the second memory section of the ROM 6b:

$$(Ey_1-Gy_3-Dy_5+Fy_7)/2$$

Here, in the case of the forward direction transformation, the multiplication and accumulation data corresponding to the less and more significant bits are transmitted to the complement generator $\mathbf{7}_1$ and then outputted as they are to the registers $\mathbf{8}_{11}$ and $\mathbf{8}_{12}$, respectively. In the case of the inverse direction transformation, on the other hand, 2' complements are calculated and then outputted to the registers $\mathbf{8}_{11}$ and $\mathbf{8}_{12}$, respectively.

Further, the multiplication and accumulation data corresponding to the multiplication and accumulation of the third row on the right side in formula ($_6$) expressed as follows are stored in the memory cells at the addresses $y_1$, $y_3$, $y_5$, $y_7$ of the third memory section of the ROM 6b:

$$(Fy_1-Dy_3+Gy_5+Ey_7)/2$$

Here, the multiplication and accumulation data corresponding to the less and more significant bits are read by and held in the pipe-line registers $\mathbf{8}_{13}$ and $\mathbf{8}_{14}$, respectively.

Further, the multiplication and accumulation data corresponding to the multiplication and accumulation of the fourth row on the right side in formula (6) expressed as follows are stored in the memory cells at the addresses $y_1$, $y_3$, $y_5$, $y_7$ of the fourth memory section of the ROM 6b:

$$(Gy_1-Fy_3+Ey_5-Dy_7)/2$$

Here, in the case of the forward direction transformation, the multiplication and accumulation data corresponding to the less and more significant bits are transmitted to the complement generator $\mathbf{7}_2$ and then outputted as they are to the registers $\mathbf{8}_{15}$ and $\mathbf{8}_{16}$, respectively. In the case of the inverse direction transformation, on the other hand, 2' complements are calculated and then outputted to the registers $\mathbf{8}_{15}$ and $\mathbf{8}_{16}$, respectively.

Figure 5A:
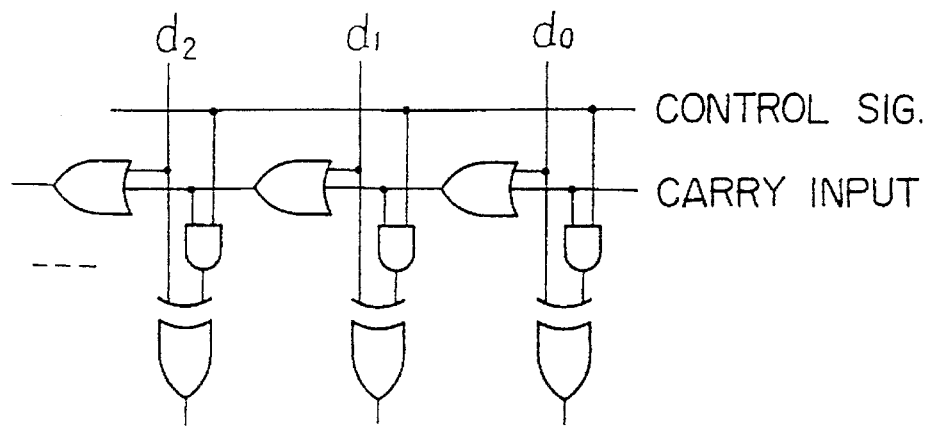
FIGS. 5A to 5C are circuit diagrams showing practical examples of complement generators.
Figure 5B:
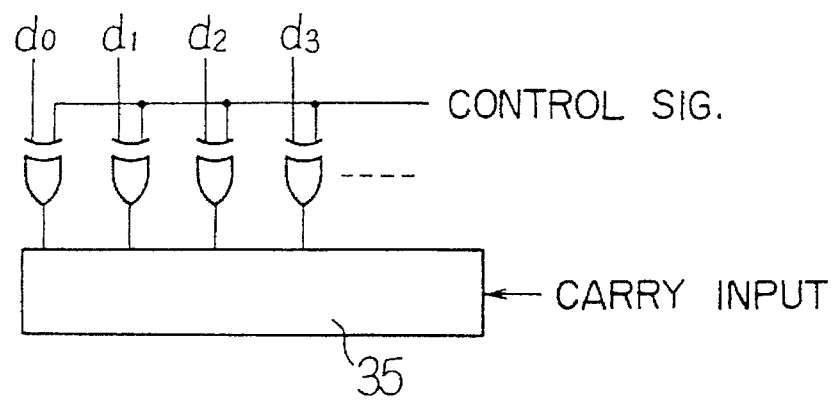
Figure 5C:
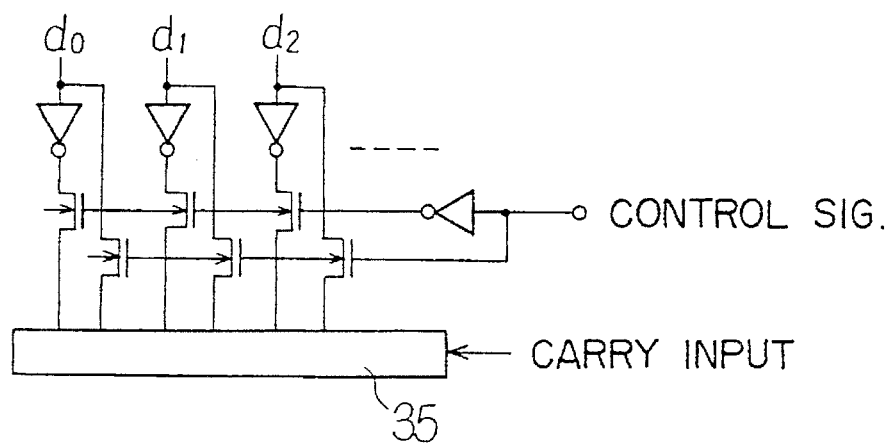

The complement generators $\mathbf{7}_i$ (i=1 and 2) outputs the 2 n-bit (n=16, in this example) data transmitted by the ROM 6b as they are in the case of the forward direction transformation, and forms 2's complements of the two n-bit data in the case of the inverse direction transformation. The complement generators $\mathbf{7}_i$ can be constructed by a circuit as shown in FIG. 5A, for instance. In FIG. 5A, if the n-bit data are denoted by $d_{n-1}$, $d_{n-2}$, . . . , $d_1$, $d_0$, the complement generators $7_i$ is composed of (2n–1) units of OR circuits, 2n-units of AND circuit, and 2n-units of exclusive OR circuits. Further, the control signal is at an "L" level in the case of the forward direction transformation and at an "H" level in the case of the inverse direction transformation. Further, an inputted carry signal is at the "L" level in the case of the inverse direction transformation. In the circuit construction as shown in FIG. 5A, the exclusive OR circuits output the data the same as the input data in the case of the forward direction transformation, and 2's complements in the case of the inverse direction transformation. Further, in FIG. 5A, although 2's complements are generated, without being limited thereto, it is also possible to use the complement generators for generating 1'complement, as shown in FIG. 5B or 5C. In this case, it is necessary to input a carry signal to the least significant bit (LSB) in an adder 35 (adder $9_i$ in this embodiment) of the succeeding stage.

The multiplication and accumulation data $a_j$ corresponding to the less significant bits of the outputs of the registers $8_{2i-1}$ (i=1, ... , 8) and the multiplication and accumulation data corresponding to the more significant bits of the outputs of the registers $8_{2i}$ (i=1, ... , 8) are added by the adders $9_i$, and the addition results ($a_j$+2.$b_j$) are transmitted to the pipeline registers $10_i$ and then held thereby. These held data are transmitted to the registers $12_i$ via the adders $11_i$ for accumulation calculations. In this the accumulation, since the data ($x_{i-1}$ or $X_{i-1}$) inputted to the discrete cosine transform processor are of 16 bits and further are read from the parallel-serial converters $2_i$ 2 bits by 2 bits beginning from the less significant bits in sequence in one cycle, the accumulation calculations can be completed in 8 cycles. When the accumulative addition is executed in the j (j=1, ... , 8) cycle, if the final accumulation of the (j–1)-th cycle is denoted by $z_{j-1}$ and the output of the register $10_i$ in the j-th cycle is denoted by $C_j$, the final accumulation value $z_j$ in the j-th cycle can be expressed as follows:

$$z_j = 2^{j-1} \cdot C_j + z_{j-1}$$

Therefore, when the accumulation has been completed, in the case of the forward direction transformation, the register $12_1$ holds the multiplication and accumulation of the first row on the right side of the formula (5) as follows:

$$\{A(x_0+x_7)+A(x_1+x_6)+A(x_2+x_5)+A(x_3+x_4)\}/2 \quad (9)$$

On the other hand, in the case of the inverse direction transformation, the register $12_1$ holds the multiplication and accumulation of the first term and the first row on the right side of the formula (7) as follows:

$$(AX_0+BX_2+AX_4+CX_6)/2 \quad (10)$$

Further, in the case of the forward direction transformation, the register $12_2$ holds the multiplication and accumulation of the second row on the right side of the formula (5) as follows:

$$\{B(x_0+x_7)+C(x_1+x_6)-C(x_2+x_5)-B(x_3+x_4)\}/2 \quad (11)$$

On the other hand, in the case of the inverse direction transformation, the register $12_2$ holds the multiplication and accumulation of the first term and the second row on the right side of the formula (7) as follows:

$$(AX_0-CX_2-AX_4+BX_6)/2 \quad (12)$$

Further, in the case of the forward direction transformation, the register $12_3$ holds the multiplication and accumulation of the third row on the right side of the formula (5) as follows:

$$\{A(x_0+x_7)-A(x_1+x_6)-A(x_2+x_5)+A(x_3+x_4)\}/2 \quad (13)$$

On the other hand, in the case of the inverse direction transformation, the register $12_3$ holds the multiplication and accumulation of the first term and the third row on the right side of the formula (7) as follows:

$$(AX_0-BX_2+AX_4-CX_6)/2 \quad (14)$$

Further, in the case of the forward direction transformation, the register $12_4$ holds the multiplication and accumulation of the fourth row on the right side of the formula (5) as follows:

$$\{C(x_0+x_7)-B(x_1+x_6)+B(x_2+x_5)-C(x_3+x_4)\}/2 \quad (15)$$

On the other hand, in the case of the inverse direction transformation, the register $12_4$ holds the multiplication and accumulation of the first term and the fourth row on the right side of the formula (7) as follows:

$$(AX_0+CX_2-AX_4-BX_6)/2 \quad (16)$$

Further, in the case of the forward direction transformation, the register $12_5$ holds the multiplication and accumulation of the first row on the right side of the formula (6) as follows:

$$\{D(x_0-x_7)+E(x_1-x_6)+F(x_2-x_5)+G(x_3-x_4)\}/2 \quad (12)$$

On the other hand, in the case of the inverse direction transformation, the register $12_5$ holds the multiplication and accumulation of the second term and the fourth row on the right side of the formula (8) as follows:

$$(DX_1+EX_3+FX_5+GX_7)/2 \quad (18)$$

Further, in the case of the forward direction transformation, the register $12_6$ holds the multiplication and accumulation of the second row on the right side of the formula (6) as follows:

$$\{E(x_0-x_7)-G(x_1-x_6)-D(x_2-x_5)-F(x_3-x_4)\}/2 \quad (19)$$

On the other hand, in the case of the inverse direction transformation, the register $12_6$ holds the multiplication and accumulation of the second term and the first row on the right side of the formula (8) as follows:

$$(-EX_1+CX_3+DX_5+FX_7)/2 \quad (20)$$

Further, in the case of the forward direction transformation, the register $12_7$ holds the multiplication and accumulation of the third row on the right side of the formula (6) as follows:

$$\{F(x_0-x_7)-D(x_1-x_6)+G(x_2-x_5)+E(x_3-x_4)\}/2 \quad (21)$$

On the other hand, in the case of the inverse direction transformation, the register $12_7$ holds the multiplication and accumulation of the second term and the third row on the right side of the formula (8) as follows:

$$(FX_1-DX_3+GX_5+EX_7)/2 \quad (22)$$

Further, in the case of the forward direction transformation, the register $12_8$ holds the multiplication and accumulation of the fourth row on the right side of the formula (6) as follows:

$$\{G(x_0-x_7)-F(x_1-x_6)+E(x_2-x_5)-D(x_3-x_4)\}/2 \qquad (23)$$

On the other hand, in the case of the inverse direction transformation, the register $12_8$ holds the multiplication and accumulation of the second term and the second row on the right side of the formula (8) as follows:

$$(-GX_1+FX_3-EX_5+DX_7)/2 \qquad (24)$$

Further, the adder $13_1$ calculates an addition of both the outputs of the registers $12_1$ and $12_2$, and the adder $13_2$ calculates an addition of both the outputs of the registers $12_2$ and $12_7$. Further, the adder $13_3$ calculates an addition of both the outputs of the registers $12_3$ and $12_8$, and the adder $13_4$ calculates an addition of both the outputs of the registers $12_4$ and $12_6$.

On the other hand, the subtracter $14_1$ calculates a subtraction between both the outputs of the registers $12_4$ and $12_6$, and the subtracter $14_2$ calculates a subtraction between both the outputs of the registers $12_3$ and $12_8$. Further, the subtracter $14_3$ calculates a subtraction between both the outputs of the registers $12_2$ and $12_7$, and the subtracter $14_4$ calculates a subtraction between both the outputs of the registers $12_1$ and $12_5$.

The select switch $19_1$ selects the output $X_0$ of the register $12_1$ in the case of the forward direction transformation and the output $x_0$ of the adder $13_1$ in the case of the inverse direction transformation, and outputs the selected one to the output register $22_1$. Further, the select switch $19_2$ selects the output $X_2$ of the register $12_2$ in the case of the forward direction transformation and the output $x_2$ of the adder $13_2$ in the case of the inverse direction transformation, and outputs the selected one to the output register $22_3$.

Further, the select switch $19_3$ selects the output $X_4$ of the register $12_3$ in the case of the forward direction transformation and the output $x_4$ of the adder $13_3$ in the case of the inverse direction transformation, and outputs the selected one to the output register $22_5$. Further, the select switch $19_4$ selects the output $X_6$ of the register $12_4$ in the case of the forward direction transformation and the output $x_6$ of the adder $13_4$ in the case of the inverse direction transformation, and outputs the selected one to the output register $22_7$.

Further, the select switch $19_5$ selects the output $X_1$ of the register $12_5$ in the case of the forward direction transformation and the output $x_1$ of the subtracter $14_1$ in the case of the inverse direction transformation, and outputs the selected one to the output register $22_2$. Further, the select switch $19_6$ selects the output $X_3$ of the register $12_6$ in the case of the forward direction transformation and the output $x_3$ of the subtracter $14_2$ in the case of the inverse direction transformation, and outputs the selected one to the output register $22_4$.

Further, the select switch $19_7$ selects the output $X_5$ of the register $12_7$ in the case of the forward direction transformation and the output $x_5$ of the subtracter $14_3$ in the case of the inverse direction transformation, and outputs the selected one to the output register $22_6$. Further, the select switch $19_8$ selects the output $X_7$ of the register $12_8$ in the case of the forward direction transformation and the output $x_7$ of the subtracter $14_4$ in the case of the inverse direction transformation, and outputs the selected one to the output register $22_8$.

Accordingly, in the case of the forward direction transformation, the transformed data $X_{i-1}$ are held in the output registers $22_i$ (i=1, . . . , 8); and in the case of the inverse direction transformation, the transformed data $x_{i-1}$ are held in the output registers $22_i$ (i=1, . . . , 8). The held data are outputted to the outside in sequence.

As described above, in the discrete cosine transform processor according to the present invention, it is possible to use the multiplication and accumulation data related to the odd-degree coefficients stored in the ROM $6b$ in common for both the forward and inverse direction transformations. Therefore, it is possible to adopt the ROM $6b$ of one-bank structure, so that the size of the ROM $6b$ can be reduced. Further, in this first embodiment, although the complement generators $7_1$ and $7_2$ are provided, since the area occupied by these complement generators is not so broad, it is possible to reduce the size (occupied area) of the whole transform processor, as compared with the prior art transform processor.

Figure 4:
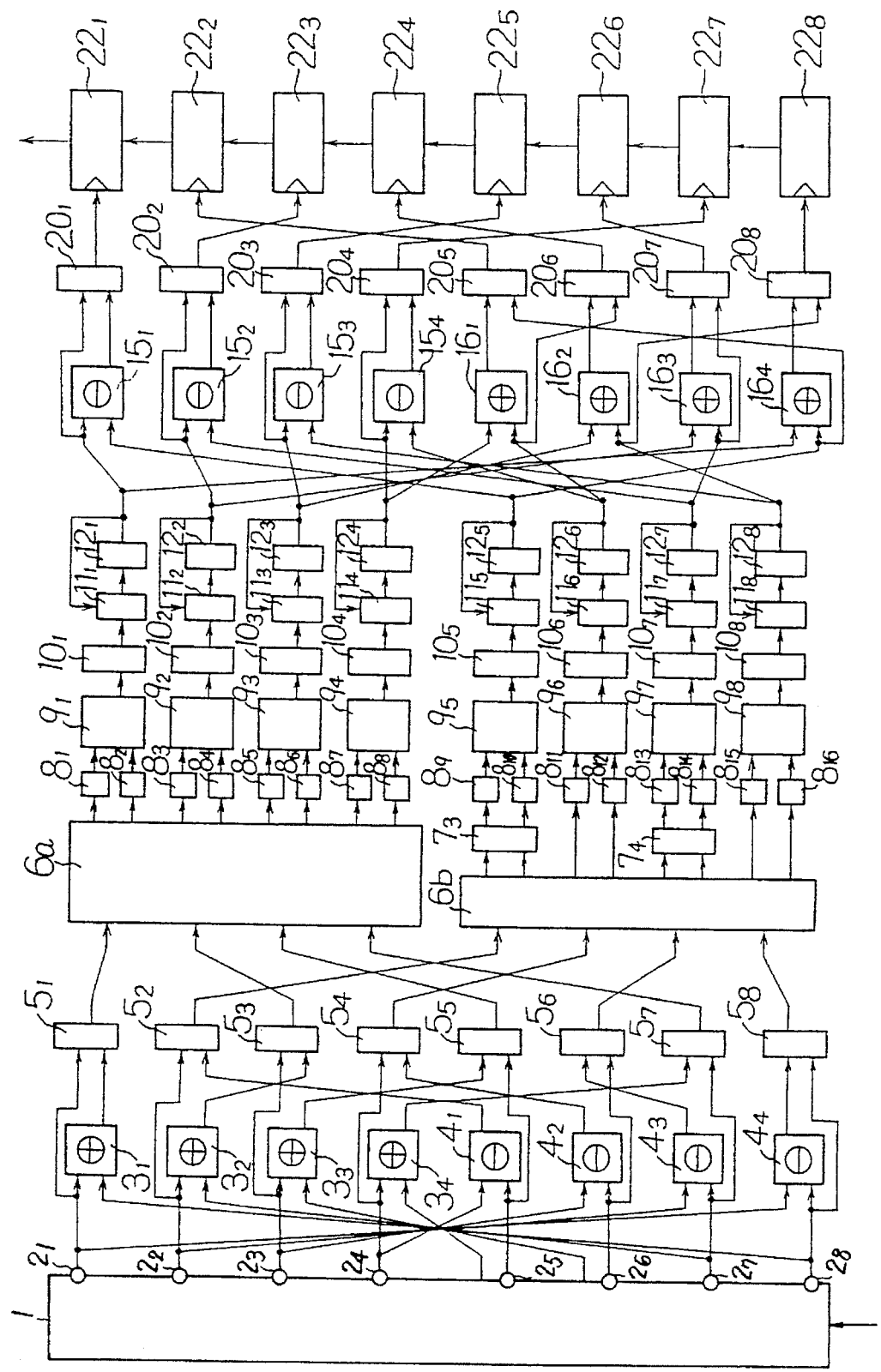
FIG. 4 is a block diagram showing a second embodiment of the discrete cosine transform processor according to the present invention.

FIG. 4 shows a second embodiment of the discrete cosine transform processor according to the present invention. In this second embodiment, when compared with the first embodiment shown in FIG. 3, complement generators $7_3$ and $7_4$ are provided instead of the complement generators $7_1$ and $7_2$; subtracters $15_1, \ldots, 15_4$ are provided instead of the adders $13_1, \ldots, 13_4$; adders $16_1, \ldots, 16_4$ are provided instead of the subtracters $14_1, \ldots, 14_4$; and select switches $20_1, \ldots, 20_8$ are provided instead of the select switches $19_1, \ldots, 19_8$, respectively. Further, in this second embodiment, the inverse direction transformation is executed in accordance with the following formula:

$$\begin{bmatrix} x_0 \\ x_2 \\ x_4 \\ x_6 \end{bmatrix} = \frac{1}{2}\begin{bmatrix} A & B & A & C \\ A & -C & -A & B \\ A & -B & A & -C \\ A & C & -A & -B \end{bmatrix}\begin{bmatrix} X_0 \\ X_2 \\ X_4 \\ X_6 \end{bmatrix} - \qquad (25)$$

$$\frac{1}{2}\begin{bmatrix} -D & -E & -F & -G \\ -F & D & -G & -E \\ G & -F & E & -D \\ E & -G & -D & -F \end{bmatrix}\begin{bmatrix} X_1 \\ X_3 \\ X_5 \\ X_7 \end{bmatrix}$$

$$\begin{bmatrix} x_1 \\ x_3 \\ x_5 \\ x_7 \end{bmatrix} = \frac{1}{2}\begin{bmatrix} A & C & -A & -B \\ A & -B & A & -C \\ A & -C & -A & B \\ A & B & A & C \end{bmatrix}\begin{bmatrix} X_0 \\ X_2 \\ X_4 \\ X_6 \end{bmatrix} + \qquad (26)$$

$$\frac{1}{2}\begin{bmatrix} E & -G & -D & -F \\ G & -F & E & -D \\ -F & D & -G & -E \\ -D & -E & -F & -G \end{bmatrix}\begin{bmatrix} X_1 \\ X_3 \\ X_5 \\ X_7 \end{bmatrix}$$

In the above formulae (25) and (26), the calculation signs of the second term on the right side of each of the formulae (7) and (8) are inverted, and in addition the components of the coefficient matrix of the second term are inverted.

The complement generators $7_3$ and $7_4$ are provided with the functions the same as with the case of the complement generators $7_1$ and $7_2$ of the first embodiment. The complement generator $7_3$ transmits the output data of the first memory section of the ROM $6b$ as they are in the case of the forward direction transformation, but calculates 2's complements and transmits the calculated results to the registers $8_9$ and $8_{10}$ in the case of the inverse direction transformation. The complement generator $7_4$ transmits the output data of the third memory section of the ROM $6b$ as they are in the case of the forward direction transformation, but calculates 2's complements and transmits the calculated results to the registers $8_{13}$ and $8_{14}$ in the case of the inverse direction transformation. Further, in this second embodiment, the output data of the second memory section of the ROM $6b$ are transmitted directly to the registers $8_{11}$ and $8_{12}$, and the output data of the fourth memory section of the ROM $6b$ are transmitted directly to the registers $8_{15}$ and $8_{16}$.

Accordingly, when the accumulative additions have been completed, in the same way as with the case of the first embodiment, the multiplication and accumulation data obtained in accordance with the formulae (9), (11), (13) and (15) are held in the registers $12_1$, $12_2$, $12_3$, $12_4$, respectively in the case of the forward direction transformation; and the multiplication and accumulation data obtained in accordance with the formulae (10), (12), (14) and (16) are held in the registers $12_5$, $12_6$, $12_7$, $12_8$, respectively in the case of the inverse direction transformation. Further, in the same way as with the case of the first embodiment, the multiplication and accumulation data obtained in accordance with the formulae (17), (19), (21) and (23) are held in the registers $12_5$, $12_6$, $12_7$, $12_8$, respectively in the case of the forward direction transformation. However, being different from the first embodiment, the data obtained by inverting the signs of the multiplication and accumulation data obtained in accordance with the formulae (18), (20), (22) and (24) are held in the registers $12_5$, $12_6$, $12_7$, $12_8$, respectively in the case of the inverse direction transformation.

Further, the subtracter $15_1$ calculates a subtraction between the outputs of the registers $12_1$ and $12_5$, and the subtracter $15_2$ calculates a subtraction between the outputs of the registers $12_2$ and $12_7$. Further, the subtracter $15_3$ calculates a subtraction between the outputs of the registers $12_3$ and $12_8$, and the subtracter $15_4$ calculates a subtraction between the outputs of the registers $12_4$ and $12_6$.

On the other hand, the adder $16_1$ calculates an addition of the outputs of the registers $12_4$ and $12_6$, and the adder $16_2$ calculates an addition of the outputs of the registers $12_3$ and $12_8$. Further, the adder $16_3$ calculates an addition of the outputs of the registers $12_2$ and $12_7$, and the adder $16_4$ calculates an addition of the outputs of the registers $12_1$ and $12_5$.

The select switch $20_1$ selects the output $X_0$ of the register $12_1$ in the case of the forward direction transformation and output $x_0$ of the subtracter $15_1$ in the case of the inverse direction transformation, and transmits the selected output to the output register $22_1$. Further, the select switch $20_2$ selects the output $X_2$ of the register $12_2$ in the case of the forward direction transformation and output $x_2$ of the subtracter $15_2$ in the case of the revere direction transformation, and transmits the selected output to the output register $22_3$.

The select switch $20_3$ selects the output $X_4$ of the register $12_3$ in the case of the forward direction transformation and output $x_4$ of the subtracter $15_3$ in the case of the inverse direction transformation, and transmits the selected output to the output register $22_5$. Further, the select switch $20_4$ selects the output $X_6$ of the register $12_4$ in the case of the forward direction transformation and output $x_6$ of the subtracter $15_4$ in the case of the revere direction transformation, and transmits the selected output to the output register $22_7$.

The select switch $20_5$ selects the output $X_1$ of the register $12_5$ in the case of the forward direction transformation and output $x_1$ of the adder $16_1$ in the case of the inverse direction transformation, and transmits the selected output to the output register $22_2$. Further, the select switch $20_6$ selects the output $X_3$ of the register $16_6$ in the case of the forward direction transformation and output $x_3$ of the adder $16_2$ in the case of the revere direction transformation, and transmits the selected output to the output register $22_4$.

The select switch $20_7$ selects the output $X_5$ of the register $12_7$ in the case of the forward direction transformation and output $x_5$ of the adder $16_3$ in the case of the inverse direction transformation, and transmits the selected output to the output register $22_6$. Further, the select switch $20_8$ selects the output $X_7$ of the register $16_8$ in the case of the forward direction transformation and output $x_7$ of the adder $16_4$ in the case of the revere direction transformation, and transmits the selected output to the output register $22_8$.

Accordingly, in the case of the forward direction transformation, the transformed data $X_{i-1}$ are held in the output registers $22_i$ (i=1, ... , 8); and in the case of the inverse direction transformation, the transformed data $x_{i-1}$ are held in the output registers $22_i$ (i=1, ... , 8). The held data are outputted to the outside in sequence.

The some effect as with the case of the first embodiment can of course be obtained in this second embodiment.

What is claimed is:

1. A discrete cosine transform processor comprising:

first memory means for storing multiplication and accumulation data of transform matrix components for the same digit-position bit values of N-unit even-order data of 2N-units of numbered input data, at addresses determined on the basis of the same digit-position bit values of the N-unit even-order data thereof;

second memory means for storing multiplication and accumulation data of transform matrix components and the same digit-position bit values of N-unit odd-order data of 2N-units of numbered input data, at addresses determined on the basis of the same digit-position bit values of the N-unit odd-order data thereof;

inverting means for receiving a part of the data read from said second memory means, said inverting means outputting the part of the data received from said second memory means as they are in the case of a forward direction transformation, and said inverting means inverting and then outputting the part of the data receive, from said second memory means in the case of an inverse direction transformation;

first accumulation means for accumulatively adding the data read from said first memory means; and second accumulation means for accumulatively adding the data outputted by said inverting means and another part of the data read from said second memory means, the other part of the data read from said second memory means not including the part of the data received by said inverting means, wherein said first memory means stores different data for the forward and the inverse direction transformations, and said second memory means stores the same data for both the forward and the inverse direction transformations.

2. A discrete cosine transform processor for executing discrete cosine transform calculations in both forward and inverse directions on the basis of previously stored multiplication and accumulation data, said discrete cosine transform processor comprising:

first memory means for storing multiplication and accumulation data corresponding to even-order coefficients, said first memory means having a first section for storing multiplication and accumulation data for the forward direction transformation and a second section for storing multiplication and accumulation data for the inverse direction transformation;

second memory means for storing multiplication and accumulation data corresponding to odd-order coefficients, said second memory means having a third section for storing multiplication and accumulation data that is used in common for both the forward and the inverse direction transformations;

first sign inverting means for inverting signs of at least a part of the data stored in the second memory means and used in common for the forward and the inverse direction transformations.

3. The discrete cosine transform processor as defined in claim 2, wherein said second sign inverting means have complement generators for generating 2's complements of data used in common for the forward and inverse transformation stored in said second memory means.

4. The discrete cosine transform processor as defined in claim 3, which further comprises selecting means for selecting any of the data outputted from the first memory section and the data passed through said complement generators.

5. The discrete cosine transform processor as defined in claim 2, further comprising second sign inverting means for inverting sign of sign bits of multiplication and accumulation calculation result.

6. The discrete cosine transform processor as defined in claim 5, wherein said second sign inverting means outputs inverted data for a sign bit and non-inverted data for bits other than the sign bit.

7. The discrete cosine transform processor as defined in claim 2, wherein said first and second memory means are two port ROMs.

8. The discrete cosine transform processor as defined in claim 7, wherein said first and second memory means are provided with decode signals for reading out data, said decode signal being composed of N data, each being derived from one digit of N pixels.

9. The discrete cosine transform processor as defined in claim 8, wherein N is four.

10. The discrete cosine transform processor as defined in claim 2, wherein said first and second memory means are one bank ROMs.

11. The discrete cosine transform processor as defined in claim 2, wherein said first memory means is a two bank ROM and said second memory means is a one bank ROM.

12. The discrete cosine transform processor as defined in claim 2, wherein said first sign inverting means includes exclusive-or ("XOR") means.

13. The discrete cosine transform processor as defined in claim 2, wherein the multiplication and accumulation data stored at each address in the first and second memory means corresponds to a row of a transform matrix, and connecting and selecting means is used to order the data from the first and second memory means in a proper order before it is output as a result of the forward or inverse transformation.

* * * * *